United States Patent
Ishibashi

(10) Patent No.: US 6,811,583 B2
(45) Date of Patent: Nov. 2, 2004

(54) POLISHING COMPOSITION FOR A SUBSTRATE FOR A MAGNETIC DISK AND POLISHING METHOD EMPLOYING IT

(75) Inventor: Tomoaki Ishibashi, Aichi (JP)

(73) Assignee: Fujimi Incorporated, Nishikasugai-gun (JP)

(*) Notice: Subject to any disclaimer, the term of this patent is extended or adjusted under 35 U.S.C. 154(b) by 28 days.

(21) Appl. No.: 10/303,875

(22) Filed: Nov. 26, 2002

(65) Prior Publication Data

US 2003/0121214 A1 Jul. 3, 2003

(30) Foreign Application Priority Data

Nov. 28, 2001 (JP) ........................................ 2001-362137

(51) Int. Cl.$^7$ ............................ C09G 1/02; C09G 1/04; B24B 37/00; B24B 57/02
(52) U.S. Cl. ............................ 51/307; 51/308; 51/309; 106/3; 216/89; 216/100; 216/102; 216/103; 216/108
(58) Field of Search .......................... 51/307, 309, 308; 438/692, 693; 252/79.1; 106/3; 216/89, 100, 102, 103, 108, 96; 510/167

(56) References Cited

U.S. PATENT DOCUMENTS

| | | | | |
|---|---|---|---|---|
| 5,352,277 A | * | 10/1994 | Sasaki | ........................... 106/6 |
| 6,117,220 A | | 9/2000 | Kodama et al. | |
| 6,193,790 B1 | | 2/2001 | Tani | |
| 6,299,795 B1 | * | 10/2001 | Liu et al. | ................... 252/79.2 |
| 6,423,125 B1 | | 7/2002 | Ishibashi et al. | |
| 6,436,811 B1 | * | 8/2002 | Wake et al. | ................ 438/633 |
| 6,530,968 B2 | * | 3/2003 | Tsuchiya et al. | .............. 51/307 |
| 6,616,717 B2 | * | 9/2003 | Sachan et al. | ................ 51/298 |
| 2001/0051746 A1 | | 12/2001 | Hagihara et al. | |

FOREIGN PATENT DOCUMENTS

GB 2 354 525 3/2001

* cited by examiner

Primary Examiner—Michael Marcheschi
(74) Attorney, Agent, or Firm—Oblon, Spivak, McClelland, Maier & Neustadt, P.C.

(57) ABSTRACT

A polishing composition for a substrate for a magnetic disk, which comprises:

Figure 1:
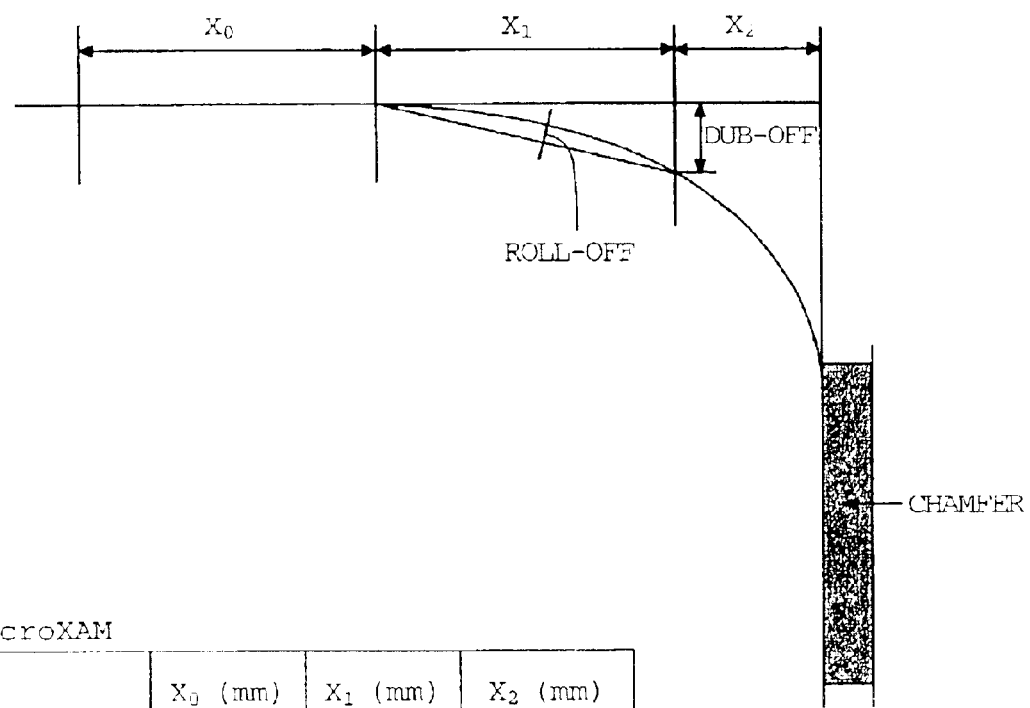

(a) a polishing accelerator composed of at least one compound selected from the group consisting of malic acid, glycolic acid, succinic acid, citric acid, maleic acid, itaconic acid, malonic acid, iminodiacetic acid, gluconic acid, lactic acid, mandelic acid, crotonic acid, nicotinic acid, aluminum nitrate, aluminum sulfate and iron(III) nitrate, (b) an edge sagging preventive agent composed of at least one compound selected from the group consisting of a polyvinylpyrrolidone, a polyoxyethylene sorbitan fatty acid ester and a polyoxyethylene sorbit fatty acid ester, (c) at least one abrasive selected from the group consisting of aluminum oxide, silicon dioxide, cerium oxide, zirconium oxide, titanium oxide and silicon carbide, and (d) water.

11 Claims, 1 Drawing Sheet

POLISHING COMPOSITION FOR A SUBSTRATE FOR A MAGNETIC DISK AND POLISHING METHOD EMPLOYING IT

The present invention relates to a polishing composition for a substrate for a magnetic disk, to be used for the production of a magnetic disk which is used as a memory device for e.g. a computer, and a polishing method employing it.

There have been continuing efforts for miniaturization, larger capacity and lower price for magnetic disks such as memory hard disks to be used for computers or electrical household appliances. At present, a substrate for a magnetic disk (hereinafter referred to simply as a substrate) to be used for the preparation of such a magnetic disk, is prepared by forming a plating film such as an electroless Ni—P plating film on a substrate (a blank material) made of a metal material such as aluminum.

In such a case, the plating film will be formed along a waviness formed at the time of forming the blank material or along irregularities on the surface of the blank material, and such a waviness or irregularities may sometimes remain on the substrate surface. Accordingly, for the purpose of removing such waviness and irregularities to make the substrate surface flat and smooth, polishing of the substrate is carried out by means of a polishing composition for a substrate for a magnetic disk (which may hereinafter sometimes be referred to simply as a polishing composition).

Along with the increase in the capacity of magnetic disks in recent years, the surface quality required for the substrate surface after the polishing has become increasingly strict, and the surface roughness is presently required to be Ra=at most 10 Å as surface roughness measured by AFM (manufactured by Digital Instruments Company (U.S.A.) as a feeler type surface roughness meter, although it may vary depending upon the grades of the magnetic disks.

Accordingly, the precision required for the substrate surface after the polishing has become extremely strict, and a polishing composition is desired whereby a more flat and smooth polished surface can be obtained.

For the above-mentioned purpose, polishing has heretofore been carried out by means of a polishing composition comprising aluminum oxide or various other abrasives, water and various polishing accelerators. For example, JP-A-61-278587 and JP-A-62-25187 disclose a polishing composition for a memory hard disk, which is prepared by adding aluminum nitrate, nickel nitrate or nickel sulfate as a polishing accelerator to water and aluminum hydroxide, followed by mixing to obtain a slurry.

Further, JP-A-2-84485 discloses an acidic polishing composition for an aluminum magnetic disk, which comprises water and an alumina abrasive powder as well as gluconic acid or lactic acid as a polishing accelerator and colloidal alumina as a surface modifier, JP-A-7-133477 discloses an aqueous polishing composition comprising an alumina abrasive, colloidal alumina and an alkali nitrite, and JP-A-9-316430 discloses a polishing composition for a magnetic disk substrate, which comprises water, α-alumina and a polishing accelerator, wherein the polishing accelerator is aluminum oxalate.

Further, those having constructions as disclosed in JP-A-7-216345 and JP-A-2000-1665 are also known. The former polishing composition comprises water, an alumina abrasive and a polishing accelerator composed of a molybdate and an organic acid, while the latter polishing composition comprises water and at least one abrasive selected from the group consisting of aluminum oxide, silicon dioxide, cerium oxide, zirconium oxide, titanium oxide, silicon nitride and manganese dioxide and further contains succinic acid or its salt dissolved in this composition.

Each of these polishing compositions of conventional constructions has a high stock removal rate and is designed to suppress formation of surface defects such as microprotrusions and fine pits on the substrate surface by carrying out polishing of the substrate by means of each polishing composition.

On the other hand, in order to meet the requirement to increase the capacity of a memory hard disk, it is desired not only to make the polished surface more flat and smooth but also to effectively utilize the peripheral portion (the edge portion) of a memory hard disk to enlarge the memory area thereby to increase the memory capacity.

However, with the polishing compositions of conventional constructions, if polishing of a substrate is carried out by means of such a polishing composition, edge sagging may result at the edge portion of the substrate, whereby there has been a problem that the edge portion of the memory hard disk can not effectively be utilized. With a substrate having sagging formed at the edge portion, it will be difficult for a magnetic head designed to read out and write memory information to maintain the distance (the flying height) from the substrate which is rotated at a high speed, and it becomes impossible to record data at such an edge portion, thus leading to a problem that the memory region for data will be reduced.

The present invention has been made in view of such a problem in the prior art, and it is an object of the present invention to provide a polishing composition for a substrate for a magnetic disk, whereby formation of edge sagging at the edge portion of a substrate during polishing, is suppressed thereby to secure a wider memory region by effectively utilizing the edge portion of the memory hard disk and whereby a substrate can be polished at a high stock removal rate, and formation of surface defects in the substrate for a magnetic disk after the polishing, can be suppressed, and a polishing method employing such a composition.

For the purpose of accomplishing the above object, the present invention provides 1) a polishing composition for a substrate for a magnetic disk, which comprises (a) a polishing accelerator composed of at least one compound selected from the group consisting of malic acid, glycolic acid, succinic acid, citric acid, maleic acid, itaconic acid, malonic acid, iminodiacetic acid, gluconic acid, lactic acid, mandelic acid, crotonic acid, nicotinic acid, aluminum nitrate, aluminum sulfate and iron(III) nitrate, (b) an edge sagging preventive agent composed of at least one compound selected from the group consisting of a polyvinylpyrrolidone, a polyoxyethylene sorbitan fatty acid ester and a polyoxyethylene sorbit fatty acid ester, (c) at least one abrasive selected from the group consisting of aluminum oxide, silicon dioxide, cerium oxide, zirconium oxide, titanium oxide and silicon carbide, and (d) water.

Further, the present invention provides 2) the polishing composition for a substrate for a magnetic disk according to the above 1), wherein the polyoxyethylene sorbitan fatty acid ester and the polyoxyethylene sorbit fatty acid ester in (b) are at least one compound selected from the group consisting of polyoxyethylene sorbitan monolaurate, polyoxyethylene sorbitan monopalmitate, polyoxyethylene sorbitan monostearate, polyoxyethylene sorbitan monooleate, polyoxyethylene sorbitan trioleate, polyoxyethylene sorbitan monocaprylate and polyoxyethylene sorbit tetraoleate.

The present invention also provides 3) the polishing composition for a substrate for a magnetic disk according to the above 1), wherein the polyoxyethylene sorbitan fatty acid ester and the polyoxyethylene sorbit fatty acid ester in (b) are such that the proportion of addition of ethylene oxide is at most 30 per molecule of sorbitan or sorbit; 4) wherein the polyvinylpyrrolidone in (b) has an average molecular weight of from 2,500 to 2,900,000; or 5) wherein the content of the component (b) is from 0.001 to 2 wt % based on the total weight of the polishing composition.

Further, the present invention provides 6) the polishing composition for a substrate for a magnetic disk according to the above 1), wherein the content of the component (a) is from 0.01 to 25 wt % based on the total weight of the polishing composition; and 7) a polishing method for a substrate for a magnetic disk, which comprises polishing a substrate for a magnetic disk by means of the polishing composition as defined in any one of the above 1) to 6).

In the accompanying drawing, FIG. 1 is a diagram illustrating measurement positions to evaluate edge sagging.

Now, the present invention will be described in detail with reference to the preferred embodiments.

As mentioned above, the polishing composition for a substrate for a magnetic disk of the present invention comprises (a) a polishing accelerator composed of at least one compound selected from the group consisting of malic acid, glycolic acid, succinic acid, citric acid, maleic acid, itaconic acid, malonic acid, iminodiacetic acid, gluconic acid, lactic acid, mandelic acid, crotonic acid, nicotinic acid, aluminum nitrate, aluminum sulfate and iron(III) nitrate, (b) an edge sagging preventive agent composed of at least one compound selected from the group consisting of a polyvinylpyrrolidone, a polyoxyethylene sorbitan fatty acid ester and a polyoxyethylene sorbit fatty acid ester, (c) at least one abrasive selected from the group consisting of aluminum oxide, silicon dioxide, cerium oxide, zirconium oxide, titanium oxide and silicon carbide, and (d) water.

The polishing accelerator of the component (a) is incorporated as a polishing accelerator to accelerate the polishing of the substrate by the mechanical action of the aftermentioned abrasive of the component (c), by etching the substrate surface by a chemical action.

As specific examples of the polishing accelerator of the component (a), the above compounds may be mentioned, but among them, at least one compound selected from maleic acid, glycolic acid, succinic acid and citric acid, is preferred, and succinic acid is most preferred, since it is thereby possible to obtain a high stock removal rate and to suppress formation of surface defects such as pits or microprotrusions.

The polishing accelerators of the component (a) may be incorporated alone or in combination as a mixture of two or more of them.

Further, the content of the polishing accelerator of the component (a) is preferably from 0.01 to 25 wt %, more preferably from 0.1 to 20 wt %, most preferably from 0.2 to 10 wt %, based on the total weight of the polishing composition. If this content is less than 0.01 wt %, the stock removal rate for the polishing composition tends to be low. Further, if the content exceeds 25%, no further improvement in the stock removal rate can be expected, and the polishing cost may thereby be increased.

Further, the edge sagging preventive agent of the component (b) is incorporated as an edge sagging preventive agent which reduces the friction between the polishing pad and the substrate to a proper degree thereby to prevent local polishing of the edge portion of the substrate, without reducing the chemical action of the above-mentioned polishing accelerator or the mechanical polishing action of the abrasive of the after-described component (c).

As specific examples of the edge sagging preventive agent of the component (b), the above compounds may be mentioned, but among them, the polyvinyl pyrrolidone preferably has a molecular weight of from 2,500 to 2,290, 000, more preferably from 6,000 to 450,000, most preferably from 6,000 to 80,000, from a viewpoint such that formation of edge sagging of the substrate can thereby be more efficiently suppressed.

On the other hand, the polyoxyethylene sorbitan fatty acid ester and the polyoxyethylene sorbit fatty acid ester are preferably at least one compound selected from the group consisting of polyoxyethylene sorbitan monolaurate, polyoxyethylene sorbitan monopalmitate, polyoxyethylene sorbitan monostearate, polyoxyethylene sorbitan monooleate, polyoxyethylene sorbitan trioleate, polyoxyethylene sorbitan monocaprylate and polyoxyethylene sorbit tetraoleate, more preferably, at least one compound selected from the group consisting of polyoxyethylene sorbitan monopalmitate, polyoxyethylene sorbitan monostearate, polyoxyethylene sorbitan monooleate and polyoxyethylene sorbit tetraoleate, most preferably, polyoxyethylene sorbitan monooleate.

Further, with respect to the polyoxyethylene sorbitan fatty acid ester and the polyoxyethylene sorbit fatty acid ester, the proportion of addition of ethylene oxide, is preferably at most 30, more preferably at most 20, per molecule of sorbitan or sorbit.

The edge sagging preventive agents of the component (b) may be incorporated alone or in combination as a mixture of two or more of them.

The content of the component (b) is preferably from 0.001 to 2 wt %, more preferably from 0.005 to 0.5 wt %, most preferably from 0.01 to 0.1 wt %, based on the total weight of the polishing composition.

If this content is less than 0.001 wt %, it tends to be difficult to suppress edge sagging. On the other hand, if the content exceeds 2 wt %, no further effect to prevent edge sagging will be obtained, and the stock removal rate is rather likely to deteriorate.

Next, at least one abrasive selected from the group consisting of aluminum oxide, silicon dioxide, cerium oxide, zirconium oxide, titanium oxide and silicon carbide, of the component (c), is incorporated to polish the substrate surface etched with the polishing accelerator of the above-mentioned component (a), by a mechanical action.

As the aluminum oxide, α-alumina, δ-alumina, θ-alumina, κ-alumina and others having different forms may be mentioned. Further, one called fumed alumina may be mentioned in view of the production method. Further, as the silicon dioxide, colloidal silica, fumed silica and various ones having different properties or formed by different methods are present.

As the cerium oxide, trivalent or tetravalent one in view of the valency and one having a hexagonal system, cubic system or face-centered cubic system in view of the crystal system may be mentioned. Further, as the zirconium oxide, monoclinic system, tetragonal system and amorphous one may be mentioned in view of the crystal system. Further, one called fumed zirconia may be mentioned in view of the production method.

As the titanium oxide, titanium monoxide, dititanium trioxide, titanium dioxide and others may be mentioned in view of the crystal system. Further, one called fumed titania may be mentioned in view of the production method. Further, as the silicon nitride, α-silicon nitride, β-silicon nitride, amorphous silicon nitride and others having different forms may be mentioned.

As the silicon carbide, α-silicon carbide, β-silicon carbide, amorphous silicon carbide and others having different forms may be mentioned.

Here, in the polishing composition of the present invention, the above components may be optionally combined as the case requires. In the case where they are combined, the combination method and the ratio of components used are not particularly limited.

The above abrasive is to polish a surface to be polished by a mechanical action as abrasive grains. The size of the abrasive grains varies depending upon the type of the abrasive grains, the type of the surface to be treated, the polishing conditions and the specification required for a substrate, and is not particularly limited. But, the particle size of silicon dioxide is preferably from 0.005 to 0.5 µm, particularly preferably from 0.01 to 0.3 µm, as the average particle size obtained from the surface area measured by a BET method.

Further, the particle size of aluminum oxide, zirconium oxide, titanium oxide, silicon nitride or silicon carbide is preferably from 0.01 to 2 µm, particularly preferably from 0.05 to 1.5 µm, as the average particle size (D50) measured by means of a laser diffraction particle size analyzer LS-230 (manufactured by Coulter, U.S.A.). Further, the particle size of cerium oxide is preferably from 0.01 to 0.5 µm, particularly preferably from 0.05 to 0.45 µm, as the average particle size observed by a scanning electron microscope.

If the average particle size of such an abrasive exceeds the above range, the surface roughness of the polished surface may be significant or scratches may be formed, and due care will accordingly be required during polishing. On the other hand, if it is less than the above range, the stock removal rate tends to be extremely low, such being unpractical as a polishing composition.

The content of the component (c) is preferably from 0.1 to 40 wt %, more preferably from 1 to 25 wt %, based on the total weight of the polishing composition.

If this content is less than 0.1 wt %, the mechanical polishing action by the polishing composition tends to be weak, and the stock removal rate is likely to be small. On the other hand, if the content exceeds 40%, the viscosity of the polishing composition or the waste liquid is likely to increase, whereby its handling tends to be difficult. Further, the polishing pad is likely to be clogged, and the stock removal rate tends to be low, and surface defects are likely to be formed.

Water of the component (d) is incorporated as a solvent for the polishing accelerator of the component (a) and the edge sagging preventive agent of the component (b) and as a dispersing medium for the abrasive of the component (c). The water is preferably one containing impurities as little as possible. Specifically, one having deionized water filtrated, or distilled water, is preferred.

The pH of the polishing composition is preferably within a range of from 2 to 7. If the pH is less than 2, the machine to be employed for polishing, such as the polishing machine, is likely to be corroded. On the other hand, if the pH exceeds 7, the stock removal rate of the polishing composition tends to be low, and the surface roughness of the substrate after polishing tends to increase, and scratches are likely to be formed. Accordingly, if the pH of the polishing composition is less than 2 or more than 7, it is preferred to adjust the pH of the polishing composition within the above-mentioned range by adding an acid or an alkali to the polishing composition.

The polishing composition may contain, as other additive components, a cellulose such as cellulose, carboxymethyl cellulose or hydroxyethyl cellulose, a water-soluble alcohol such as ethanol, propanol or ethylene glycol, a surfactant such as a sodium alkylbenzenesulfonate or a formalin-condensate naphthalene sulfonic acid, an organic polyanionic substance such as a lignin sulfonate or a polyacrylate, a water-soluble polymer (an emulsifier) such as polyvinyl alcohol, a chelate agent such as dimethyl glyoxime, dithizone, oxine, acetylacetone, glycine, EDTA or NTA, and a fungicide such as sodium alginate or potassium hydrogencarbonate. The content of such other additive components may be determined in accordance with a usual method for a polishing composition.

The polishing composition is prepared by mixing and dispersing the respective components other than water, to water. A specific example for mixing and dispersing may be stirring by means of a vane-type agitator, supersonic dispersion or shearing agitation by means of e.g. a homomixer. Further, with respect to the order of mixing the respective components other than water, all may be mixed at the same time, or any of them may be mixed later.

Now, a method for producing a memory hard disk as a magnetic disk, and a method for polishing a substrate for a magnetic disk by means of the polishing composition will be described.

To produce a memory hard disk, firstly, a primary film is formed by plating such as electroless Ni—P plating, on the surface of a blank material. Then, using the polishing composition, the substrate surface is polished. The polishing method and the polishing conditions at that time are selected in accordance with a common method for polishing substrates. Further, as a specific example of the polishing machine to be used for the polishing, a single-side polishing machine or a double-side polishing machine may be mentioned. As a specific example of the polishing pad, a suede type, a nonwoven fabric type, a woven fabric type, a flocked fabric type or a raising type may be mentioned.

As a specific example for the substrate to be polished, a Ni—P disk, a Ni—Fe disk, a boron carbide disk or a carbon disk may be mentioned. Among them, a Ni—P disk having a Ni—P electroless plating film formed on the surface of a blank material made of aluminum, an aluminum alloy or the like, is particularly preferred, since it is inexpensive and readily available.

Then, texture processing is carried out by forming on the substrate surface a concentric texture along the rotational direction of the memory hard disk, by means of a texturing composition comprising an abrasive such as fine powder of diamond, a polishing accelerator, water, etc. On the substrate surface having a texture thus formed, a magnetic layer and a protective layer are formed to obtain a memory hard disk. In recent years, for a memory hard disk, it has been desired to make the substrate surface more flat than ever to meet the requirement for a higher capacity. Accordingly, the polishing may be carried out in two steps, so that in the first polishing step, polishing is carried out for the purpose of removing a waviness of the substrate and large surface defects such as scratches or irregularities on the substrate surface, which can not be removed in the second finish polishing step.

Whereas, in the second polishing step, finish polishing is carried out for the purpose of adjusting the surface roughness to the desired small level and removing surface defects formed in the first polishing step or surface defects which were not completely removed in the first polishing step.

In some cases, the polishing may be carried out as divided into three or more than three steps.

The polishing composition of the present invention may be used in any one of these polishing steps. For example, when it is used in the first polishing step, a polishing composition having a large stock removal rate is prepared to increase the mechanical action by using an abrasive having a relatively large particle size. Whereas, for finish polishing in the second or subsequent step, a polishing composition suitable for finish polishing, is prepared in order to suppress the mechanical action and to adjust it with the chemical action, by using an abrasive having a relatively small particle size.

Further, for the purpose of accomplishing a high capacity of a memory hard disk, light texturing may be carried out so that the texture formed on the substrate surface will be thinner. Further, a memory hard disk may be produced by using a non-textured substrate without carrying out the texturing. The polishing composition of the present invention may be used to produce either a substrate having common texturing or the above-mentioned light texturing applied, or a non-textured substrate.

Further, with respect to the polishing composition for a substrate for a magnetic disk of the present invention, firstly, the polishing composition may be prepared in the form of a stock solution having a relatively high concentration, and later on, when it is used for polishing, it may be diluted with water and then used. In such a manner, it is possible to improve the handling efficiency during the transportation or storage.

Now, embodiments (hereinafter referred to as Examples) of the present invention will be described in detail as compared with Comparative Examples.

SAMPLES OF EXAMPLES AND COMPARATIVE EXAMPLES

Table 1 is a Table showing the constituting components of the respective polishing compositions of Examples 1 to 28 and Comparative Examples 1 to 9.

The respective polishing compositions were, respectively, prepared by mixing and dispersing the polishing accelerator, the edge sagging preventive agent and the abrasive as identified in Table 1 in deionized water. The abrasive used for the compositions was one containing 20 wt % of aluminum oxide having an average particle size of 0.8 $\mu$m, and each polishing composition was prepared so that the total amount would be 100 wt %.

With respect to each polishing composition (Examples 1 to 28 and Comparative Examples 1 to 9) in Table 1, the pH was measured, and then, tests and evaluations were carried out with respect to the following items. The results are shown in Table 2.

TABLE 1

| | Polishing accelerator | | Edge sagging preventive agent | | |
|---|---|---|---|---|---|
| Example | Type | Amount (wt %) | Type | Average molecular weight | Proportion of addition of ethyleneoxide | Amount (wt. %) |
| Ex. 1 | Succinic acid | 0.5 | A1 | 1200 | 20 | 0.06 |
| Ex. 2 | Succinic acid | 1 | A1 | 1200 | 20 | 0.02 |
| Ex. 3 | Succinic acid | 1 | A1 | 1200 | 20 | 0.06 |
| Ex. 4 | Succinic acid | 1 | A1 | 1200 | 20 | 0.2 |
| Ex. 5 | Succinic acid | 1.5 | A1 | 1200 | 20 | 0.06 |
| Ex. 6 | Succinic acid | 1 | A2 | 1200 | 20 | 0.06 |
| Ex. 7 | Succinic acid | 1 | A3 | 1200 | 20 | 0.06 |
| Ex. 8 | Succinic acid | 1 | A4 | 1200 | 30 | 0.06 |
| Ex. 9 | Malic acid | 1 | A1 | 1200 | 20 | 0.06 |
| Ex. 10 | Citric acid | 1 | A1 | 1200 | 20 | 0.06 |
| Ex. 11 | Glycolic acid | 2 | A1 | 1200 | 20 | 0.06 |
| Ex. 12 | Maleic acid | 1 | A1 | 1200 | 20 | 0.06 |
| Ex. 13 | Itaconic acid | 1 | A1 | 1200 | 20 | 0.06 |
| Ex. 14 | Malonic acid | 1 | A1 | 1200 | 20 | 0.06 |
| Ex. 15 | Iminodiacetic acid | 1 | A1 | 1200 | 20 | 0.06 |
| Ex. 16 | Aluminum nitrate | 4 | A1 | 1200 | 20 | 0.06 |
| Ex. 17 | Succinic acid | 0.5 | PVP | 6000–15000 | | 0.06 |
| Ex. 18 | Succinic acid | 1 | PVP | 6000–15000 | | 0.02 |
| Ex. 19 | Succinic acid | 1 | PVP | 6000–15000 | | 0.06 |
| Ex. 20 | Succinic acid | 1 | PVP | 6000–15000 | | 0.2 |
| Ex. 21 | Succinic acid | 1.5 | PVP | 6000–15000 | | 0.06 |
| Ex. 22 | Succinic acid | 1 | PVP | 40000–80000 | | 0.06 |
| Ex. 23 | Succinic acid | 1 | PVP | 240000–450000 | | 0.06 |
| Ex. 24 | Succinic acid | 1 | PVP | 900000–1500000 | | 0.06 |
| Ex. 25 | Succinic acid | 1 | PVP | 2000000–2900000 | | 0.06 |
| Ex. 26 | Malic acid | 1 | PVP | 6000–15000 | | 0.06 |
| Ex. 27 | Citric acid | 1 | PVP | 6000–15000 | | 0.06 |
| Ex. 28 | Glycolic acid | 2 | PVP | 6000–15000 | | 0.06 |
| Comp. Ex. 1 | Succinic acid | 1 | | | | |
| Comp. Ex. 2 | Malic acid | 1 | | | | |
| Comp. Ex. 3 | Citric acid | 1 | | | | |
| Comp. Ex. 4 | Glycolic acid | 1 | | | | |
| Comp. Ex. 5 | Succinic acid | 1 | B | 40000–80000 | | 0.06 |
| Comp. Ex. 6 | Succinic acid | 1 | C | 410 | | 0.06 |
| Comp. Ex. 7 | Succinic acid | 1 | D | 350 | | 0.06 |
| Comp. Ex. 8 | Succinic acid | 1 | E | 300 | | 0.06 |
| Comp. Ex. 9 | Succinic acid | 1 | F | 50000 | | 0.06 |

A1: Polyoxyethylene sorbitan monooleate
A2: Polyoxyethylene sorbitan monostearate
A3: Polyoxyethylene sorbitan monopalmitate

TABLE 1-continued

| | Polishing accelerator | | Edge sagging preventive agent | | |
|---|---|---|---|---|---|
| Example | Type | Amount (wt %) | Type | Average molecular weight | Proportion of addition of ethyleneoxide | Amount (wt. %) |

A4: Polyoxyethylene sorbitan tetraoleate
PVP: Polyvinylpyrroridone
B: Sodium polyacrylate
C: Disodium lauryl sulfosuccinate
D: Sodium dodecylbenzene sulfonate
E: Coconut oil fatty acid diethanol
F: Poly-dimethylmethylene piperinium chloride (1) Polishing Test Using each polishing composition in Table 1 and employing a substrate as an object to be polished, a polishing test was carried out. The conditions for the polishing test were as follows.

Polishing Conditions

Object to be polished (substrate): Electroless Ni—P plating substrate of 3.5 inches in diameter
   Number of objects polished: 15 substrates
   Polishing machine: Double-side polishing machine (platen diameter: 700 mm)
   Polishing pad: BELLATRIX N0048 (manufactured Kanebo, Ltd.)
   Load: 100 g/cm$^2$
   Upper platen rotational speed: 24 rpm
   Lower platen rotational speed: 16 rpm
   Composition dilution ratio: 1:3 pure water
   Supply rate of the polishing composition: 150 cc/min
   Polished amount of substrate: 3 μm as a machining allowance (double side)

(By carrying out a preliminary test, with respect to each polishing composition in Table 1, the stock removal rate was preliminarily obtained by a method as shown in the following (2), and the polishing time was set so that the machining allowance would be constant.)

(2) Measurement of Stock Removal Rate

The substrate after the polishing test was washed and dried, and the weight of the substrate was measured before and after the polishing, whereupon the stock removal rate was determined from the difference (the weight reduction), the specific gravity of electroless Ni—P plating and the area of the substrate, and the polishing time. The evaluation standards for the stock removal rate were as follows.
   ⊚: at least 0.70 μm/min
   ○: at least 0.65 μm/min and less than 0.70 μm/min
   △: at least 0.60 μm/min and less than 0.65 μm/min
   ×: less than 0.60 μm/min (3) Measurement of Edge Sagging By means of MicroXAM (manufactured by PhaseShift Company, U.S.A.), Roll-Off and Dub-Off representing the shape of the edge portion of the substrate, were measured at positions in FIG. 1. Here, FIG. 1 shows the cross-section of the edge portion of a substrate, wherein the horizontal direction (X axis) indicates a diameter axis on the surface of the substrate, and the vertical direction indicates the thickness direction of the substrate.

With respect to the measuring method regarding such Roll-Off and Dub-Off, the measuring position and the measuring method are not commonly defined and optionally specified by an individual manufacturer of substrates.

FIG. 1 is a diagram illustrating measurement positions relating to Roll-Off and Dub-Off.

This time, the present inventors have evaluated edge sagging by calculating how much the Roll-Off and Dub-Off values are improved between before and after polishing, on the basis of the Roll-Off and Dub-Off values measured at the respective points in FIG. 1. This measurement method is appropriate for evaluation of edge sagging at the edge portion of the substrate and is a method commonly employed.

Now, Table 2 is one showing the test evaluation results of edge sagging (Roll-Off and Dub-Off) with respect to each polishing composition.

Roll-Off and Dub-Off of a polishing composition (Comparative Example 1) not containing the edge sagging preventive agent of the present invention are represented by HR0 and HD0, respectively, and those of a polishing composition containing the edge sagging preventive agent are represented by HR and HD, respectively, and then the effect A (%) for improvement of the edge sagging by the polishing, was obtained by the following formula.

$$A\ (\%)=[1-(HR,\ HD)/(HR0,\ HD0)]\times 100$$

Further, the evaluation standards for the improvement effect A (%) are as follows.
   ⊚: improvement effect A is at least 20%
   ○: improvement effect A is at least 10 and less than 20%
   △: improvement effect A is less than 10%
   ×: no improvement effect observed

TABLE 2

| | | Edge sagging | | Stock |
|---|---|---|---|---|
| | pH | Roll-Off | Dub-Off | removal rate |
| Ex. 1 | 3.4 | ⊚ | ⊚ | ○ |
| Ex. 2 | 3.4 | ⊚ | ⊚ | ⊚ |
| Ex. 3 | 3.4 | ⊚ | ⊚ | ⊚ |
| Ex. 4 | 3.4 | ⊚ | ⊚ | ⊚ |
| Ex. 5 | 3.4 | ⊚ | ⊚ | ⊚ |
| Ex. 6 | 3.4 | ⊚ | ⊚ | ⊚ |
| Ex. 7 | 3.4 | ⊚ | ⊚ | ⊚ |
| Ex. 8 | 3.4 | ⊚ | ⊚ | ⊚ |
| Ex. 9 | 2.9 | ⊚ | ⊚ | ○ |
| Ex. 10 | 2.3 | ⊚ | ⊚ | ○ |
| Ex. 11 | 2.8 | ⊚ | ⊚ | ○ |
| Ex. 12 | 2.1 | ⊚ | ⊚ | △ |
| Ex. 13 | 2.8 | ⊚ | ⊚ | △ |
| Ex. 14 | 2.3 | ⊚ | ⊚ | △ |
| Ex. 15 | 2.7 | ⊚ | ⊚ | △ |
| Ex. 16 | 3.7 | ⊚ | ⊚ | △ |
| Ex. 17 | 3.4 | ⊚ | ⊚ | ○ |
| Ex. 18 | 3.4 | ⊚ | ⊚ | ○ |

TABLE 2-continued

|  | pH | Edge sagging | | Stock removal rate |
|---|---|---|---|---|
|  |  | Roll-Off | Dub-Off |  |
| Ex. 19 | 3.4 | ◎ | ◎ | ○ |
| Ex. 20 | 3.4 | ◎ | ◎ | ○ |
| Ex. 21 | 3.4 | ◎ | ◎ | ○ |
| Ex. 22 | 3.4 | ◎ | ◎ | ○ |
| Ex. 23 | 3.4 | ◎ | ◎ | Δ |
| Ex. 24 | 3.4 | ◎ | ◎ | Δ |
| Ex. 25 | 3.4 | ◎ | ◎ | Δ |
| Ex. 26 | 2.9 | ◎ | ◎ | Δ |
| Ex. 27 | 2.3 | ◎ | ◎ | Δ |
| Ex. 28 | 2.8 | ◎ | ◎ | Δ |
| Comp. Ex. 1 | 3.4 | X | X | ◎ |
| Comp. Ex. 2 | 2.9 | X | X | ○ |
| Comp. Ex. 3 | 2.3 | X | X | ○ |
| Comp. Ex. 4 | 2.8 | X | X | ○ |
| Comp. Ex. 5 | 3.4 | Δ | Δ | ○ |
| Comp. Ex. 6 | 3.4 | X | X | ○ |
| Comp. Ex. 7 | 3.4 | X | X | ○ |
| Comp. Ex. 8 | 3.4 | X | X | ○ |
| Comp. Ex. 9 | 3.4 | X | X | ○ |

As shown in Table 2, in each of Examples 1 to 28, evaluation was excellent with respect to Roll-Off and Dub-Off. On the other hand, with the conventional polishing compositions (Comparative Examples 1 to 4) wherein the edge sagging preventive agent of the present invention was not incorporated or with the polishing compositions (Comparative Examples 5 to 9) wherein a surfactant other than the edge sagging preventive agent of the present invention, was incorporated, evaluation was low with respect to Roll-Off and Dub-Off.

Further, the surface of a substrate polished by means of each polishing composition in Table 1, was observed at 20 points each by using a differential interference microscope (×50, manufactured by Nikon Corporation), whereby in each case, surface defects such as microprotrusions, scratches, etc. were not observed.

The present invention provides the following effects as is evident from the embodiments of the present invention described in detail in the foregoing.

The polishing composition for a substrate of a magnetic disk of the present invention contains the above-described edge sagging preventive agent of the component (b), whereby formation of edge sagging at the edge portion of the substrate during polishing, can be prevented, and it is thereby possible to secure a wider memory region by effectively utilizing the edge portion of the memory hard disk. Furthermore, as the polishing accelerator of the component (a) is incorporated, the substrate can be polished at a large stock removal rate, and it is possible to prevent formation of surface defects in the substrate for a magnetic disk after the polishing.

Namely, (1) in the first aspect, the present invention provides a polishing composition for a substrate for a magnetic disk, which comprises (a) a polishing accelerator composed of at least one compound selected from the group consisting of malic acid, glycolic acid, succinic acid, citric acid, maleic acid, itaconic acid, malonic acid, iminodiacetic acid, gluconic acid, lactic acid, mandelic acid, crotonic acid, nicotinic acid, aluminum nitrate, aluminum sulfate and iron(III) nitrate, (b) an edge sagging preventive agent composed of at least one compound selected from the group consisting of a polyvinylpyrrolidone, a polyoxyethylene sorbitan fatty acid ester and a polyoxyethylene sorbit fatty acid ester, (c) at least one abrasive selected from the group consisting of aluminum oxide, silicon dioxide, cerium oxide, zirconium oxide, titanium oxide and silicon carbide, and (d) water, whereby formation of edge sagging at the edge portion of the substrate during polishing can be suppressed without forming surface defects in the substrate for a magnetic disk after the polishing.

(2) In the second aspect of the present invention, the polyoxyethylene sorbitan fatty acid ester and the polyoxyethylene sorbit fatty acid ester in (b) are at least one compound selected from the group consisting of polyoxyethylene sorbitan monolaurate, polyoxyethylene sorbitan monopalmitate, polyoxyethylene sorbitan monostearate, polyoxyethylene sorbitan monooleate, polyoxyethylene sorbitan trioleate, polyoxyethylene sorbitan monocaprylate and polyoxyethylene sorbit tetraoleate, whereby, in addition to the effects in the above (1), formation of edge sagging at the edge portion of the substrate can further be suppressed.

(3) In the third aspect of the present invention, the polyoxyethylene sorbitan fatty acid ester and the polyoxyethylene sorbit fatty acid ester in (b) are such that the proportion of addition of ethylene oxide per molecule of sorbitan or sorbit, is at most 30; (4) in the fourth aspect of the present invention, the polyvinylpyrrolidone in (b) has an average molecular weight of from 2,500 to 2,900,000; and (5) in the fifth aspect of the present invention, the content of the component (b) is from 0.001 to 2 wt % based on the total weight of the polishing composition, whereby, in addition to the effects in the above (1), formation of edge sagging at the edge portion of the substrate can further be suppressed more certainly.

Further, (6) in the sixth aspect of the present invention, the content of the component (a) is from 0.01 to 25 wt % based on the total weight of the polishing composition, whereby, in addition to the effects mentioned in the above (1), the stock removal rate can be stably increased.

(7) In the seventh aspect, the present invention provides a polishing method for a substrate for a magnetic disk, which comprises polishing a substrate for a magnetic disk by means of the polishing composition as defined in any one of the above (1) to (6), whereby an excellent substrate for a magnetic disk can be prepared.

The entire disclosure of Japanese Patent Application No. 2001-362137 filed on Nov. 28, 2001 including specification, claims, drawings and summary is incorporated herein by reference in its entirety.

What is claimed is:

1. A polishing composition for a substrate for a magnetic disk, which comprises:
   (a) a polishing accelerator composed of at least one compound selected from the group consisting of malic acid, glycolic acid, succinic acid, citric acid, maleic acid, itaconic acid, malonic acid, iminodiacetic acid, gluconic acid, lactic acid, mandelic acid, crotonic acid, nicotinic acid, aluminum nitrate, aluminum sulfate and iron(III) nitrate,
   (b) an edge sagging preventive agent composed of at least one compound selected from the group consisting of, a polyoxyethylene sorbitan fatty acid ester and a polyoxyethylene sorbit fatty acid ester,
   (c) at least one abrasive selected from the group consisting of aluminum oxide, silicon dioxide, cerium oxide, zirconium oxide, titanium oxide and silicon carbide, and
   (d) water.

2. The polishing composition for a substrate for a magnetic disk according to claim 1, wherein the polyoxyethylene sorbitan fatty acid ester and the polyoxyethylene sorbit fatty acid ester in (b) are at least one compound selected from the group consisting of polyoxyethylene sorbitan monolaurate, polyoxyethylene sorbitan monopalmitate, polyoxyethylene sorbitan monostearate, polyoxyethylene sorbitan monooleate, polyoxyethylene sorbitan trioleate, polyoxyethylene sorbitan monocaprylate and polyoxyethylene sorbit tetraoleate.

3. The polishing composition for a substrate for a magnetic disk according to claim 1, wherein the polyoxyethylene sorbitan fatty acid ester and the polyoxyethylene sorbit fatty acid ester in (b) are such that the proportion of addition of ethylene oxide is at most 30 per molecule of sorbitan or sorbit.

4. The polishing composition for a substrate for a magnetic disk according to claim 1, wherein the content of the component (b) is from 0.001 to 2 wt % based on the total weight of the polishing composition.

5. The polishing composition for a substrate for a magnetic disk according to claim 1, wherein the content of the component (a) is from 0.01 to 25 wt% based on the total weight of the polishing composition.

6. The polishing composition for a substrate for a magnetic disk according to claim 1, wherein (b) is polyoxyethylene sorbitan monooleate.

7. The polishing composition for a substrate for a magnetic disk according to claim 1, wherein (b) is polyoxyethylene sorbitan monostearate.

8. The polishing composition for a substrate for a magnetic disk according to claim 1, wherein (b) is polyoxyethylene sorbitan monopalmitate.

9. The polishing composition for a substrate for a magnetic disk according to claim 1, wherein (b) is polyoxyethylene sorbit tetraoleate.

10. A polishing method for a substrate for a magnetic disk, which comprises polishing a substrate for a magnetic disk by means of using a polishing composition comprising:

(a) a polishing accelerator composed of at least one compound selected from the group consisting of malic acid, glycolic acid, succinic acid, citric acid, maleic acid, itaconic acid, malonic acid, iminodiacetic acid, gluconic acid, lactic acid, mandelic acid, crotonic acid, nicotinic acid, aluminum nitrate, aluminum sulfate and iron (III) nitrate, (b) an edge sagging preventive agent composed of at least one compound selected from the group consisting of a polyvinylpyrrolidone, a polyoxyethylene sorbitan fatty acid ester and a polyoxyethylene sorbit fatty acid ester, (c) at least one abrasive selected from the group consisting of aluminum oxide, silicon dioxide, cerium oxide, zirconium oxide, titanium oxide and silicon carbide, and (d) water.

11. The polishing method according to claim 10, wherein the polishing composition consists essentially of defined components (a), (b), (c) and (d).

* * * * *